United States Patent [19]

Albrecht et al.

[11] Patent Number: 5,346,386
[45] Date of Patent: Sep. 13, 1994

[54] DEVICE FOR BLOW MOULDING

[75] Inventors: Peter Albrecht, Hamburg; Michael Linke, Ahrensburg; Marek Peterko, Tornesch, all of Fed. Rep. of Germany

[73] Assignee: Krupp Corpoplast Maschinenbau GmbH, Hamburg, Fed. Rep. of Germany

[21] Appl. No.: 44,257

[22] Filed: Apr. 7, 1993

[30] Foreign Application Priority Data

Apr. 15, 1992 [DE] Fed. Rep. of Germany ....... 4212583

[51] Int. Cl.$^5$ .............................................. B29C 49/56
[52] U.S. Cl. .................... 425/541; 425/451.9
[58] Field of Search ...................... 425/540, 541, 450.1, 425/451.4, 451.9, 451

[56] References Cited

U.S. PATENT DOCUMENTS

| 2,834,154 | 5/1958 | Koob | 425/541 X |
| 3,825,396 | 7/1974 | Kontz | 425/451.9 X |
| 3,854,857 | 12/1974 | Fischer et al. | 425/541 X |
| 4,579,519 | 4/1986 | Maser et al. | 425/541 |
| 4,611,981 | 9/1986 | English | 425/541 X |
| 4,822,275 | 4/1989 | Voss et al. | 425/540 X |
| 4,834,642 | 5/1989 | Voss et al. | 425/450.1 X |
| 5,064,366 | 11/1991 | Voss | 425/541 |

FOREIGN PATENT DOCUMENTS 39-16941  8/1964  Japan ................................. 425/541

Primary Examiner—Richard L. Chiesa
Attorney, Agent, or Firm—Harness, Dickey & Pierce

[57] ABSTRACT

This device is used for the blow moulding of thermoplastic synthetic material, with it having a blow mould consisting of at least two blow-moulding elements. The blow mould is provided with an internal space designed for shaping a produced container. The blow moulding elements are arranged in the region of pivotally seated mould carriers. The mould carriers are guided on a shaft and a locking device is provided in the area of the end of the mould carrier facing away from the shaft. In the region of their extension facing away from the locking device, the mould carriers project beyond the shaft by means of their actuating arms. The actuating arms are rotationally coupled to an adjusting element via coupling levers. The adjusting element is guided essentially in the direction of a center line of the blow mould.

18 Claims, 7 Drawing Sheets

DEVICE FOR BLOW MOULDING

BACKGROUND AND SUMMARY OF THE INVENTION

The invention relates to a device for blow moulding of thermoplastic material, which has a blow mould consisting of at least two blow mould elements, with this blow mould having an interior space for the purpose of moulding a container, whereby the blow mould elements are arranged within the area of pivotally seated mould carriers.

Such devices are used in the area of rotationally driven blow wheels as well as in the area of stationary equipment. With the help of the blow mould, containers are blow moulded, for example from premoulds, that are manufactured out of a polyethylene terephthalate in an injection moulding process, with these containers being suited to holding beverages or other products.

In the devices used in the past, the design implementations for executing opening and closing movements have not met all the requirements for an uncomplicated design, a long life, and a low-cost production process.

Therefore, the object of this invention is to improve a device of the type mentioned above so as to create an uncomplicated mechanical design, providing a simple operating system, and to increase operating safety.

This object of the invention is accomplished in that the mould carriers are mounted onto a shaft, that a locking mechanism is installed in the area of the mould-carrier ends that are aligned opposite to the shaft, and that the mould carriers in the area of their extension opposite to the locking device rise above the shaft with their operating arms, which can be rotated and are connected via coupling levers to a regulating element, which is essentially mounted in the direction of a center line of the blow mould.

Because the mould carriers are being mounted on the shaft, a course of strain lines occurs through the shaft in a closed state. This situation creates favorable force inputs. Furthermore, additional locking mechanisms in the area of the mould-carrier ends opposite the shaft can be dispensed with. With the help of the locking mechanism in the area of the ends opposite the shaft, a mechanical connection of the mould carriers in a closed state is created. The operating arms allow for movement of the mould carriers according to the operating principles of a pair of scissors. Because of the connection of the adjusting element via the linking lever with the operating arms, it is possible to convert a linear motion in the direction of the center line of the blow mould into a closing motion without requiring an extensive mechanism for this process. The operation of the mould carriers is thus a purely mechanical process, so that at any point in operation an exactly defined positioning is given. Therefore in exceptional situations, at any point in time a termination of the respective course of motion and a locking of the moved elements in the respective position is possible. This results in a considerable reduction of the risk of accidents.

A preferred embodiment of this invention provides for the adjusting element being designed as a roller, which is positioned by a linking lever in the direction of the center line, which lever is connected to a shaft in the area of an end opposite to the roller. This embodiment allows in a simple fashion for the alignment of the operating elements at a given distance from the mould carriers and for the providing of a control system either above or below the mould carrier. This increases the design options for aligning the device within the area of a blow mould machine.

Another preferred embodiment provides for the alignment of the linking lever and the coupling levers in such fashion as to effect a selflocking in an opened position of the mould carrier. This selflocking mechanism reduces considerably the accident risks due to accidental mould closing motions. In particular it permits an active controlling of the adjusting element only when actual changes in positioning are to be effected. This also results in a simplified mechanical design.

According to another preferred embodiment, at least one of the blow mould elements is arranged so that it can be held in place relative to a mould carrier. Because of this fastenable arrangement it is possible to achieve a prestress on the blow mould elements after closing of the mould carrier and activation of the locking mechanism, which prevents the formation of cracks during expansion of the thermoplastic premould under pressure. This allows for the manufacture of containers of precisely specified dimensions, whose outside shapes are free from crack formations that could impair their esthetic appearance.

Other particulars of the present invention are illustrated in the following detailed description and attached drawings, which illustrate one preferred embodiment of the invention by way of example.

Figure 1:
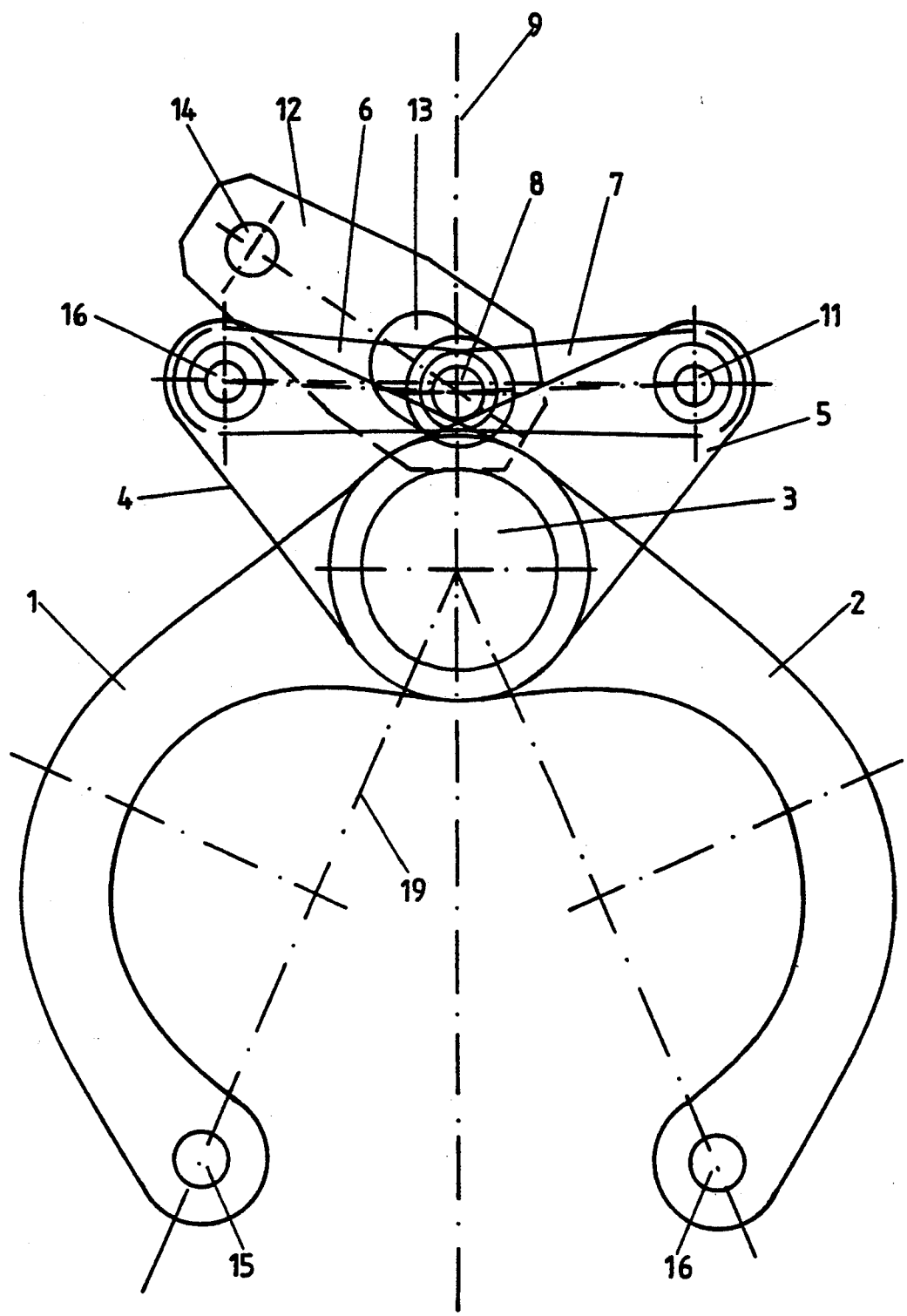
FIG. 1: a basic representation of the manner of functioning of the adjustment mechanisms of the mould carriers in an opened state.

It is seen from FIG. 1 that the mechanism for blow moulding is made up essentially of two pivotally seated mould carriers (1, 2), which are guided in the area of a shaft (3). The mould carriers (1, 2) jut beyond the shaft (3) by way of operating arms (4, 5) that are connected to an adjusting element (8) via coupling levers (6, 7). The adjusting element (8) is designed as a roller, which is movably guided in the direction of a center line (9) of a blow mould station provided with the mould carriers (1, 2). Pivot bearings (10, 11) are provided for connecting the operating arms (4, 5) with the coupling levers (6, 7).

Figure 2:
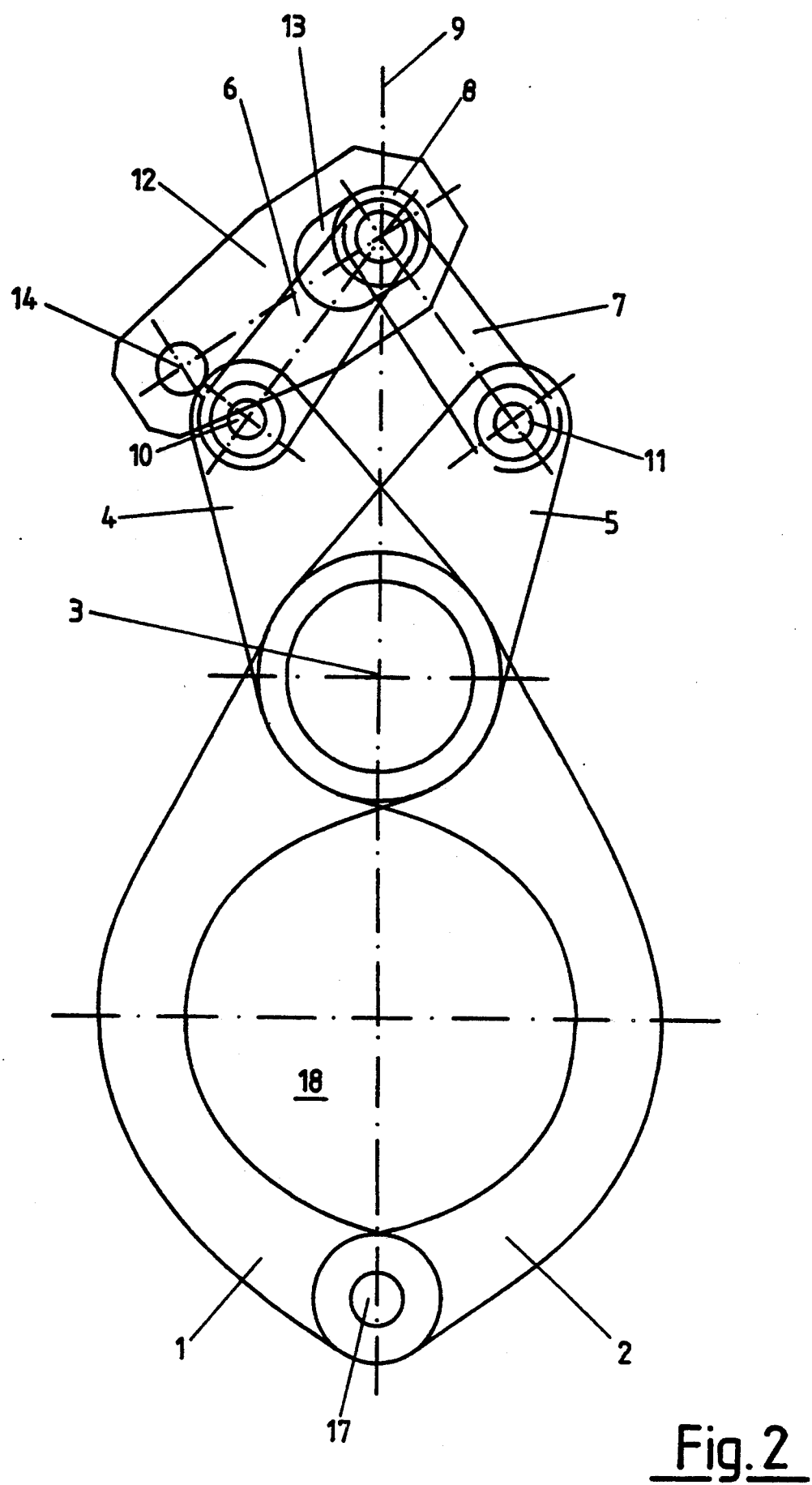
FIG. 2: a representation similar to FIG. 1 but in a closed state.

For positioning the adjusting element (8), a linking lever (12) is provided, equipped with a longitudinal slot (13) that guides the adjusting element (8). In the area of the end of the linking lever opposite the longitudinal slot (13) the linking lever (12) is coupled to a shaft (14) that permits a well-defined swiveling of the linking lever (12) and thus a positioning of the adjusting element (8) along the center line (9). In the area of the ends of the mould carriers (1, 2) opposite the operating arm (4, 5), recesses (15, 16) are provided into which a locking mechanism (17) engages when in the closed position as illustrated in FIG. 2.

In order to hold the blow mould elements, the mould carriers (1, 2) have bowed contours that laterally define an interior space (18). In the open position illustrated in FIG. 1, the mould carriers (1, 2) define an aperture angle (19). This angle may be 48°, for example.

Figure 3:
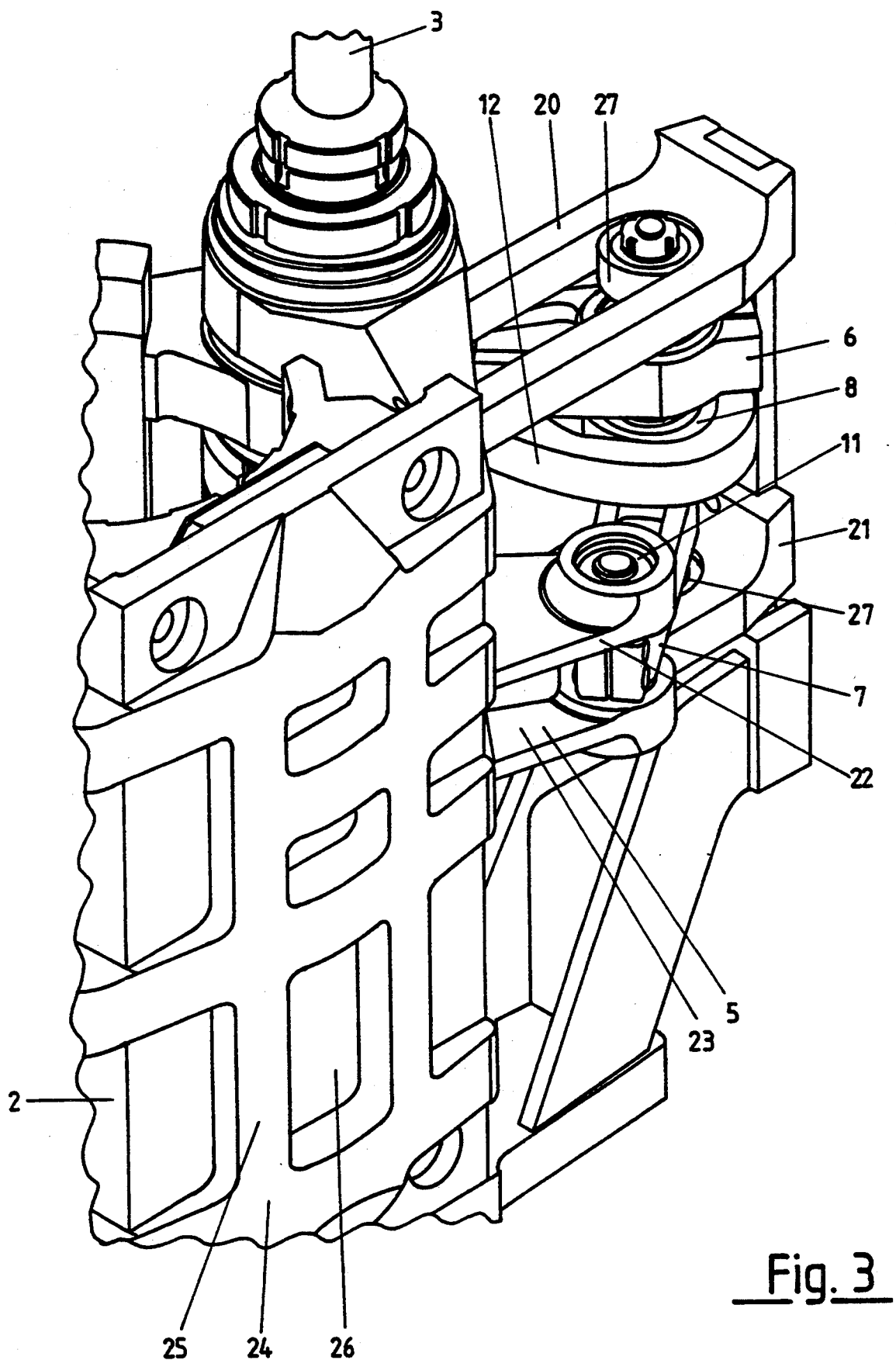
FIG. 3: a perspective view of a portion of a blow mould station.
Figure 4:
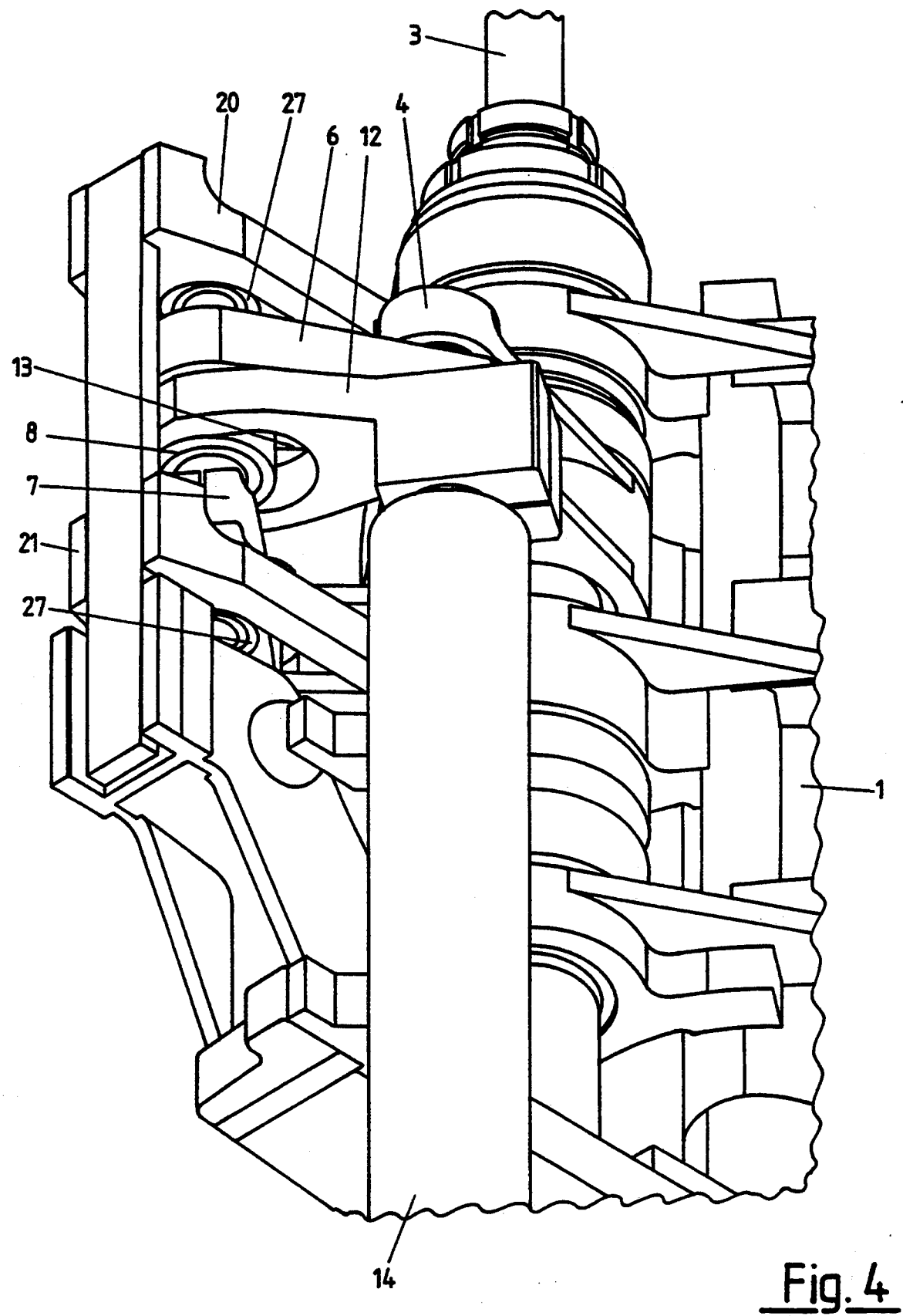
FIG. 4: another perspective view of the device as in FIG. 3, FIG. 5: a horizontal section through a closed blow mould station in which an adapter for holding a blow-mould element is arranged to permit it to be fastened in place vis-a-vis the mould carrier associated with it.

The perspective view according to FIG. 3 shows that in order to ensure a well-defined introduction of force onto the mould carriers (1, 2), two guide rollers (27) are provided, each of which are mounted on rails (20, 21) that extend in the direction of the center line (9).

Each of the operating arms (4, 5) consist of bridges (22, 23) arranged at a fixed distance from one another, between which in the area of the pivot bearings (10, 11) the coupling levers (6, 7) are mounted. In the area of an outer boundary of the mould carriers (1, 2) a contoured structure (24) is provided, which in essence is formed from bridgelike bracings (25) that surround recesses (26).

Figure 5:
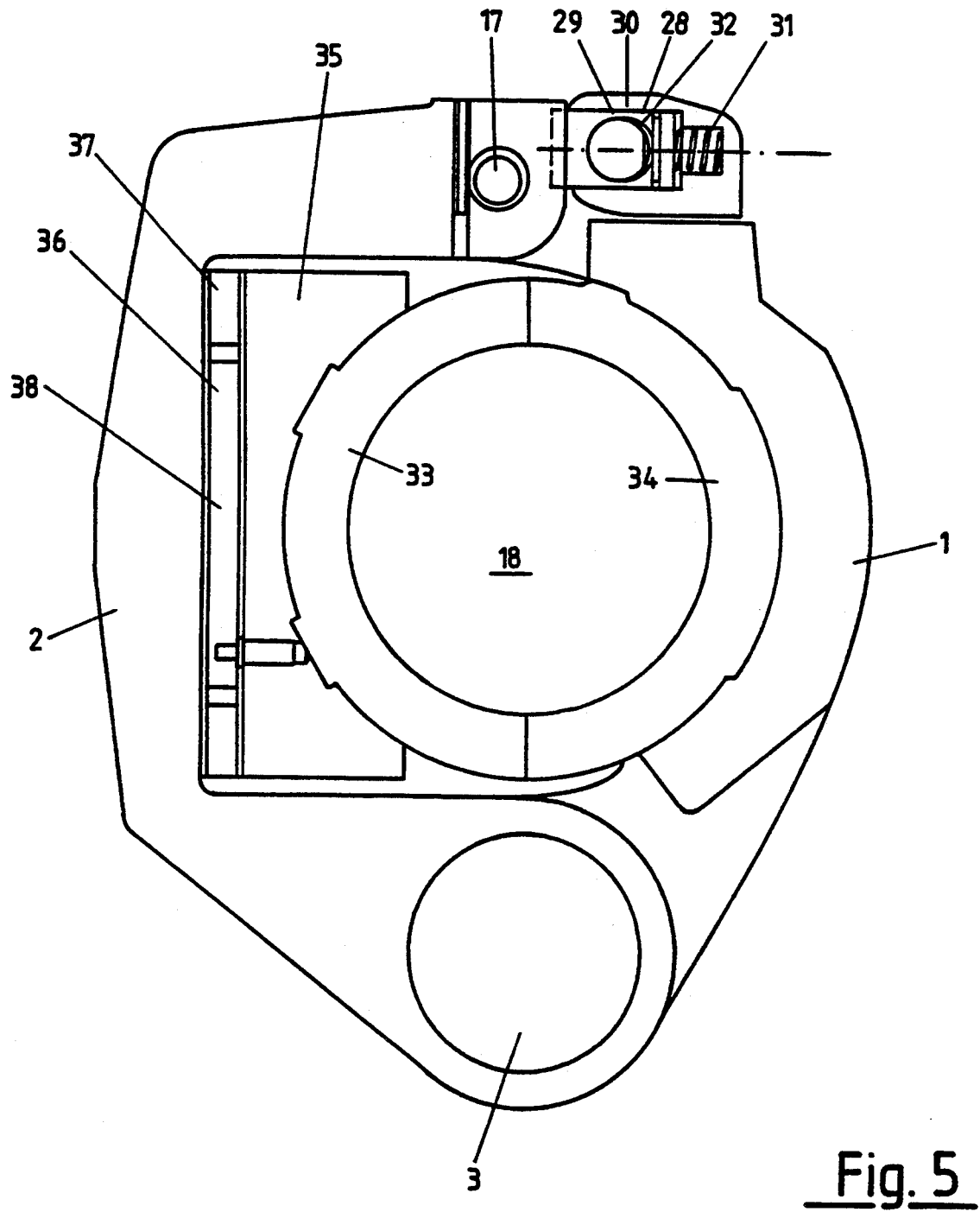

In order to avoid an inadvertent moving of the locking mechanism (17), a safety element (28) is provided, as shown in FIG. 5, which prevents in particular changes in positioning of the locking mechanism (17) because of its own weight. The safety element (28) consists essentially of a locking element (29) that is mounted so as to slide within a recess (30) and is under pressure from a spring (31). What is envisaged in particular here is to provide the locking element (29) with an elongated hole (32) through which the locking mechanism (17) is guided in terms of its position.

To allow for a clamping of blow mould elements (33, 34) relative to each other, an adapter (35) is provided in the area of one of the mould carriers (1, 2), which adapter can be acted upon by an adjusting force relative to the mould carriers (1, 2). To apply the clamping force, an adjusting element (36) is provided, that, for example, can be designed as a piston (38) surrounded by a holding ring (37). To adjust the piston (38), a hydraulic or pneumatic pressure medium, for example, can be provided.

Figure 6:
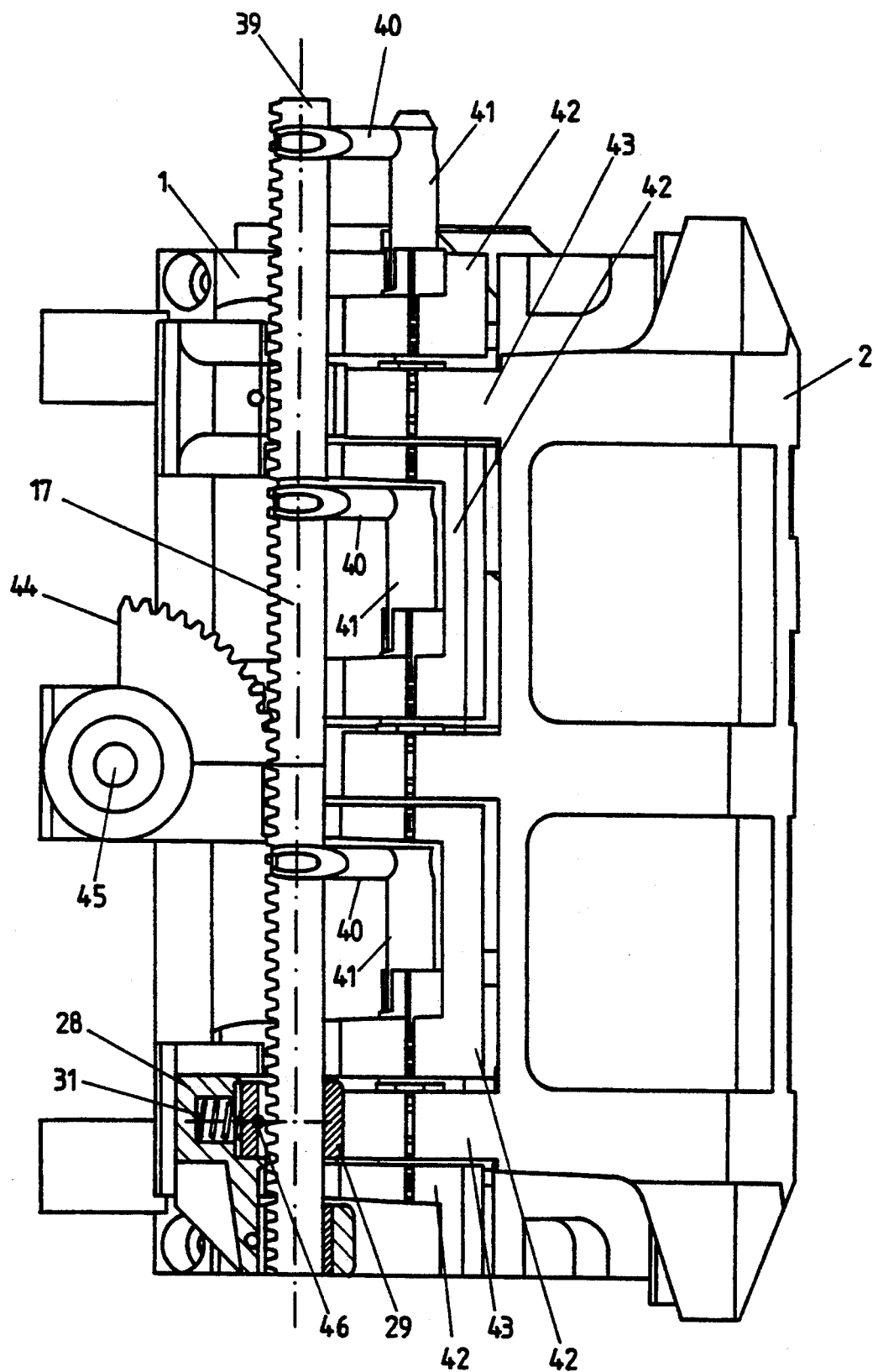
FIG. 6: side view of a blow mould station in the area of a locking mechanism
Figure 7:
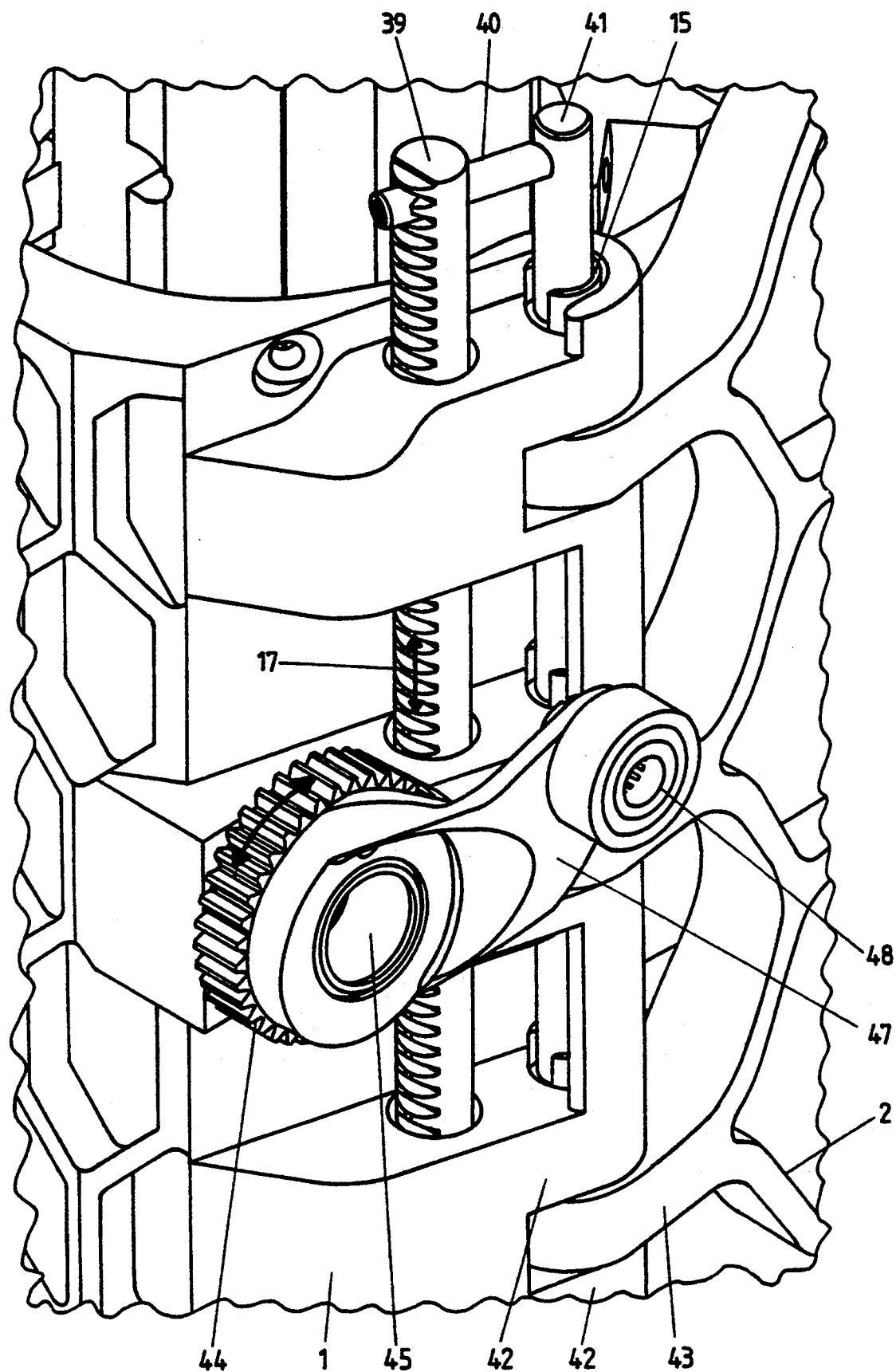
FIG. 7: a perspective view of a blow mould station in the area of the locking mechanism.

A detailed diagram of the locking mechanism (17) is illustrated in FIG. 6. The locking mechanism (17) consists essentially of a toothed rack (39), which is connected via crosspieces (40) to locking pins (41). These locking pins (41) essentially run in parallel with the toothed rack (39). To effect locking, the locking pins (41) are introduced into the recesses (15, 16) of the mould carriers (1, 2). The recesses (15, 16) here are positioned in the area of projections (42, 43) of the mould carriers (1, 2). What is envisaged here especially is to provide three locking pins (41) and to guide each locking pin (41) through three projections (42, 43), two of which are connected to one of the mould carriers (1, 2) and the remaining projection (42, 43) is connected to the other mould carrier (1, 2). In order to even out fabrication tolerances, what is envisaged here especially is to suspend in gimbal fashion the locking pins (41) on the toothed rod (39) via the crosspieces (40).

To adjust the toothed rod (39) a toothed wheel (44) is provided, that, for instance, can also be designed as a wheel segment. The toothed wheel (44) is adjusted via a locking shaft (45). The longitudinal section through safety element (28) as illustrated in FIG. 6 shows that the locking element (29) is essentially in the shape of a sleeve, and that in the area of a portion of the extension of the elongated hole (32) an engaging element (46) is arranged which upon a displacement of the spring (31) meshes into the teething of the toothed rack (39), preventing a shifting of the toothed rack (39). The safety element (28) unlocks automatically when the blow mould station is closed. In an arrangement of the safety element (28) in the area of the mould carrier (1), the positioning of the locking element (29) can be made with the help of the projection (43), which engages between the projections (42) connected to the mould carrier (1).

To adjust the toothed wheel (44), a lever (47) can be provided that is attachable to a positioning element via a pivot bearing (48).

Arranging the blow mould carriers (1, 2) in the area of a rotating blow wheel makes it easily possible to provide a curve control that can be sensed via cam rollers. This allows for an unequivocal coordinating of the positioning movements of the mould carriers (1, 2) and of the locking mechanism (17) with the rotational position of the blow wheel.

The respective curve segments need only to extend over that area in which also the position changes actually have to be made. Unintentional changes in positioning of the locking mechanism (17) are prevented through the safety element (8), and a securing of the blow mould carriers (1, 2) in an open position is effected via the knee lever principle of the combination of operating arms (4, 5), the coupling levers (6, 7) and the adjusting element (8).

We claim:

1. Device for blow moulding of a thermoplastic synthetic material comprising a blow mould consisting of at least two blow moulding elements, said blow mould being provided with an internal space intended for shaping a container to be produced and in which the blow moulding elements are arranged in the region of mould carriers supported so that they can be swiveled, said mould carriers (1, 2) being mounted on a shaft (3), a locking device (17) provided in the area of the ends of the mould carriers (1, 2) positioned away from the shaft (3), and the mould carriers (1, 2) in the region of their extension away from the locking device (17) project beyond the shaft (3) by means of actuating arms (4, 5) which via elongated coupling levers (6, 7) are coupled rotationally to an adjusting element (8), which is substantially guided in the direction of a center line (9) of the blow mould, the longitudinal axis of said coupling levers being angled relative to said actuating arms when said mould carriers are in an open position such that a force exerted on either of said mould carriers in a direction toward the other mould carrier a resulting force will be exerted on said adjusting element in a direction toward said shaft and means for limiting movement of said adjusting element beyond a predetermined point toward said shaft whereby said mould carriers are self-locked in an open position.

2. Device according to claim 1 wherein a linking lever (12) is provided for positioning of the adjusting element (8), said linking lever having a longitudinal slot (13) for guiding the adjusting element (8) and in the region of its extension away from the adjusting element (8) is connected to a second shaft (14) for presetting a rotational positioning.

3. Device according to claim 2, wherein a curve control system is provided for positioning the adjusting element (8), with said system being sensed by cam rollers.

4. Device according to claim 3, wherein the curve control system is formed from curve segments, which are positioned in a stationary fashion in the region of a rotatably seated blow wheel.

5. Device according to claim 4, wherein said second shaft (14) is adapted for connection to a control element.

6. Device according to claim 5, wherein the adjusting element (8) is connected via joining pieces to guide rollers (27), which in this region are guided by rails (20, 21) that run in the direction of the center line (9).

7. Device according to claim 6, wherein said locking device (17) is formed as a toothed rack (39), which is connected via crosspieces (40) to locking pins (41), which mesh with recesses (15, 16) in the mould carriers (1, 2).

8. Device according to claim 7, wherein said locking pins (41) are suspended in gimbal fashion relative to the toothed rack (39).

9. Device according to claim 8, wherein the mould carrier (1, 2) exhibits projections (42), which in each case are equipped with a first recess (15) and between which in a closed positioning a projection (43) connected with the mould carrier (2) is mounted, said projection being equipped with a second recess (16).

10. Device according to claim 4, wherein said locking devices include a toothed rack and a safety element (28) is provided that has a blocking element (29) to fix the toothed rack (39) in an open position of the mould carriers (1, 2) which upon closing the mould carriers (1, 2) is displaced into an unlocked position.

11. Device according to claim 10, further comprising an adjusting means for holding one of the blow moulding elements (33, 34) in place relative to one of the mould carriers (1, 2).

12. Device according to claim 1, wherein a curve control system is provided for positioning the adjusting element (8), with this system being sensed by the can rollers.

13. Device according to claim 1, wherein said adjusting element (8) is connected via joining pieces to guide rollers (27), which in this region are guided by rails (20, 21) that run in the direction of the center line (9).

14. Device according to claim 1, wherein said locking device includes a toothed rack and a safety element (28) is provided that has a blocking element (29) to fix the toothed rack (39) in an opened position of the mould carriers (1, 2), which upon closing the mould carriers (1, 2) is displaced into an unlocked position.

15. Device according to claim 1, further comprising an adjusting means for holding one of the blow moulding elements (33, 34).

16. Device according to claim 1, wherein the locking device (17) is formed as a toothed rack (39), which is connected via crosspieces (40) to locking pins (41), which mesh with recesses (15, 16) in the mould carriers (1, 2).

17. A device as set forth in claim 1 wherein said area of said end of one of said mould carriers is positioned on one side of said center line of said blow mould and the region of said extension of said one mould carrier beyond said shaft is positioned on the other side of said center line, said area of said end of said other mould carrier is positioned on the other side of said center line of said blow mould and the region of said extension of said other mould carrier beyond said shaft is positioned on said one side of said center line.

18. Device according to claim 17, wherein said one and said other mould carriers cross said center line at said shaft.

* * * * *

UNITED STATES PATENT AND TRADEMARK OFFICE
CERTIFICATE OF CORRECTION

PATENT NO. : 5,346,386
DATED : September 13, 1994
INVENTOR(S) : Peter Albrecht et al It is certified that error appears in the above-identified patent and that said Letters Patent is hereby corrected as shown below:

Column 2, between lines 49 and 50, insert --Description Of The Preferred Embodiment--.

Column 5, line 27, Claim 10, "4" should be --9--.

Column 5, line 30, Claim 10, "open" should be --opened--.

Column 6, line 3, Claim 12, "the can" should be --cam--.

Signed and Sealed this

Seventh Day of February, 1995

Attest:

BRUCE LEHMAN

Attesting Officer    Commissioner of Patents and Trademarks